US009795978B2

(12) United States Patent
Johnson et al.

(10) Patent No.: US 9,795,978 B2
(45) Date of Patent: Oct. 24, 2017

(54) PAINT CAN ADAPTER FOR HANDHELD SPRAY DEVICE

(71) Applicant: Graco Minnesota Inc., Minneapolis, MN (US)

(72) Inventors: Daniel R. Johnson, Champlin, MN (US); Dale C. Pemberton, Big Lake, MN (US); Charles W. Dawson, Big Lake, MN (US); Pamela J. Muetzel, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 36 days.

(21) Appl. No.: 14/527,845

(22) Filed: Oct. 30, 2014

(65) Prior Publication Data

US 2015/0060568 A1 Mar. 5, 2015

Related U.S. Application Data

(63) Continuation-in-part of application No. PCT/US2014/037244, filed on May 8, 2014.

(Continued)

(51) Int. Cl.
*B05B 7/24* (2006.01)
*B05B 15/06* (2006.01)
(Continued)

(52) U.S. Cl.
CPC ............ *B05B 15/065* (2013.01); *B05B 7/02* (2013.01); *B05B 7/2402* (2013.01);
(Continued)

(58) Field of Classification Search
CPC . B05B 7/2408; B05B 7/2402; B05B 11/0008; B05B 15/065; B05B 7/2481; B05B 15/008; F16L 15/04
See application file for complete search history.

(56) References Cited

U.S. PATENT DOCUMENTS 2,228,861 A 1/1941 Wegener
3,401,842 A 9/1968 Morrison
(Continued)

FOREIGN PATENT DOCUMENTS

DE 668093 C 11/1938
DE 3232422 A1 3/1984
(Continued)

OTHER PUBLICATIONS

Written Opinion and International Search Report, for PCT No. PCT/US2015/037679, dated Sep. 24, 2015, 12 pages.
(Continued)

*Primary Examiner* — Alexander Valvis
(74) *Attorney, Agent, or Firm* — Kinney & Lange, P.A.

(57) ABSTRACT

An adapter allows direct connection of a handheld spray device to paint cans of varying dimensions. The adapter includes a cage for holding the paint can, a cap that connects the cage to the handheld spray device, and a gasket that seals the open upper end of the paint can to the cap. The adapter may also include a suction tube extension that is connectable between the pump inlet and the suction tube of the spray device. A can spacer insert is positionable in the cage to elevate paint cans of varying heights so that the upper ring of the paint can engages the gasket.

13 Claims, 14 Drawing Sheets

Related U.S. Application Data

(60) Provisional application No. 61/820,943, filed on May 8, 2013.

(51) Int. Cl.
| | | |
|---|---|---|
| *B05B 9/01* | (2006.01) | |
| *B05B 9/08* | (2006.01) | |
| *B05B 7/02* | (2006.01) | |
| *B05B 11/00* | (2006.01) | |
| *B05B 9/04* | (2006.01) | |
| *F16L 15/04* | (2006.01) | |
| *B05B 15/00* | (2006.01) | |
| *B05B 15/02* | (2006.01) | |

(52) U.S. Cl.
CPC .............. *B05B 7/2481* (2013.01); *B05B 9/01* (2013.01); *B05B 9/0426* (2013.01); *B05B 9/0861* (2013.01); *B05B 11/0008* (2013.01); *F16L 15/04* (2013.01); *B05B 7/2408* (2013.01); *B05B 15/008* (2013.01); *B05B 15/025* (2013.01)

(56) References Cited

U.S. PATENT DOCUMENTS

| | | | |
|---|---|---|---|
| 3,663,025 A | | 5/1972 | Nadherny et al. |
| 4,419,093 A | | 12/1983 | Deaton |
| 4,501,500 A | * | 2/1985 | Terrels ................. B05B 7/2408 239/142 |
| 4,687,140 A | | 8/1987 | Hasegawa |
| 4,693,423 A | | 9/1987 | Roe et al. |
| 5,141,162 A | | 8/1992 | Gunderson et al. |
| 5,253,900 A | * | 10/1993 | Snyder ................. B05B 7/2408 239/302 |
| 5,575,398 A | | 11/1996 | Robbins, III |
| 6,189,809 B1 | | 2/2001 | Schwebemeyer |
| 6,551,425 B2 | | 4/2003 | Sylvester |
| 7,703,704 B2 | | 4/2010 | Gohring et al. |
| 2002/0105186 A1 | * | 8/2002 | Marty ................... E03C 1/021 285/261 |
| 2006/0157064 A1 | * | 7/2006 | Davison ................ A61F 9/029 128/858 |
| 2007/0221753 A1 | | 9/2007 | Gohring et al. |
| 2008/0011879 A1 | | 1/2008 | Gerson et al. |
| 2008/0179763 A1 | | 7/2008 | Schmon et al. |
| 2009/0108089 A1 | | 4/2009 | Handzel et al. |
| 2013/0001322 A1 | | 1/2013 | Pellegrino |

FOREIGN PATENT DOCUMENTS

| | | |
|---|---|---|
| EP | 1340550 A2 | 9/2003 |
| EP | 1818106 A1 | 8/2007 |
| JP | 2005224735 A | 8/2005 |
| KR | 1020110056400 | 7/2014 |

OTHER PUBLICATIONS

First Chinese Office Action for Chinese Patent Application No. 2014800257432, dated Jan. 3, 2017, 9 pages.
Extended European Search Report, for European Patent Application No. 14794494.6, dated Nov. 18, 2016, 7 pages.
U.S. Non-Final Office Action for U.S. Appl. No. 14/889,697, dated Aug. 5, 2016, 19 pages.
Amendment for U.S. Appl. No. 14/889,697, filed Jan. 4, 2017, 12 pages.
Written Opinion & International Search Report, for PCT Patent Application No. PCT/US2014/037244, dated Sep. 5, 2014, 9 pages.
Extended European Search Report for EP Application No. 15786855.5, dated Mar. 20, 2017, 7 Pages.
International Preliminary Report on Patentability for PCT Application No. PCT/US2015/037679, dated May 2, 2017, 9 pages.
Taiwan Office Action for Taiwan Patent Application No. 103116423, dated May 23, 2017, 12 pages.

* cited by examiner

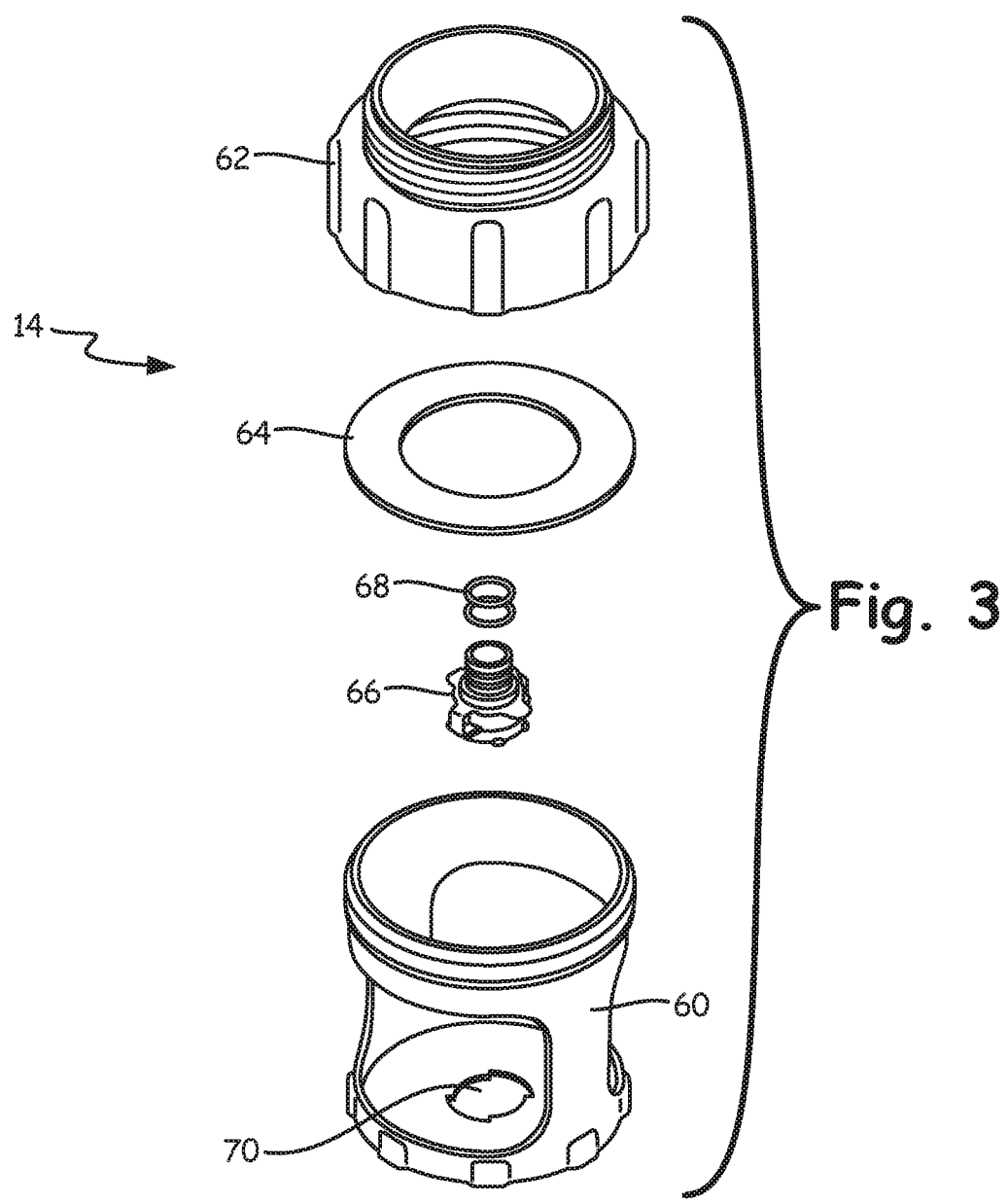

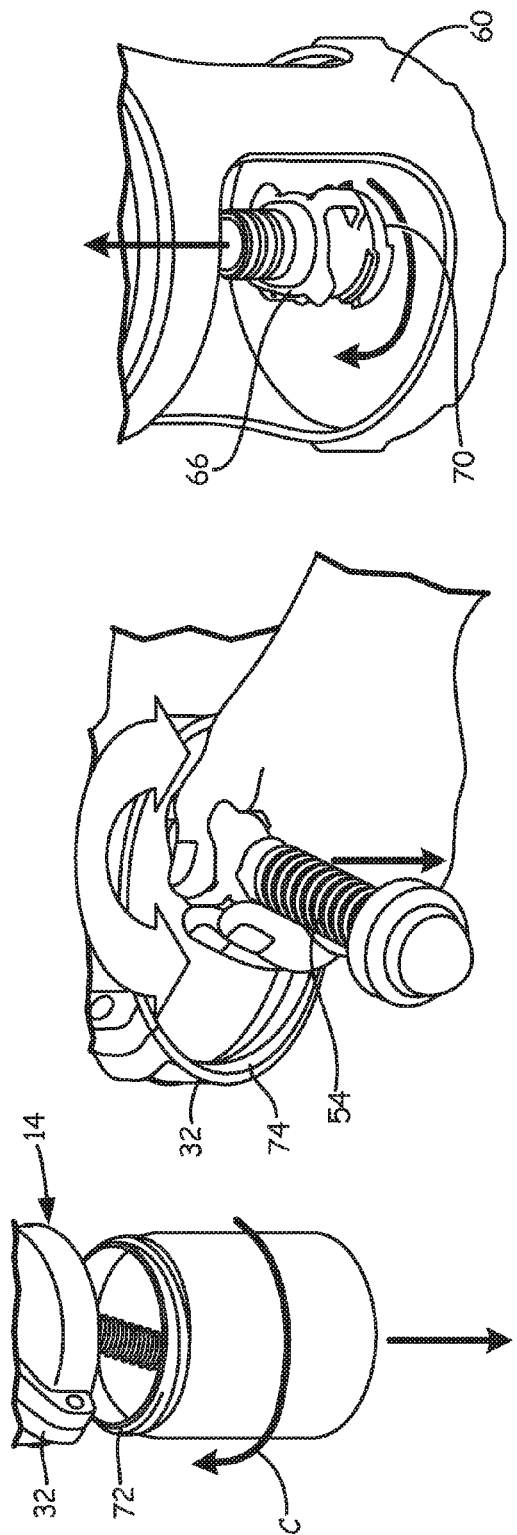
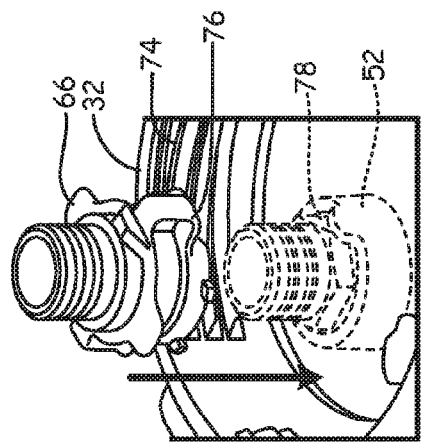
Fig. 4A
Fig. 4B
Fig. 4C
Fig. 4D

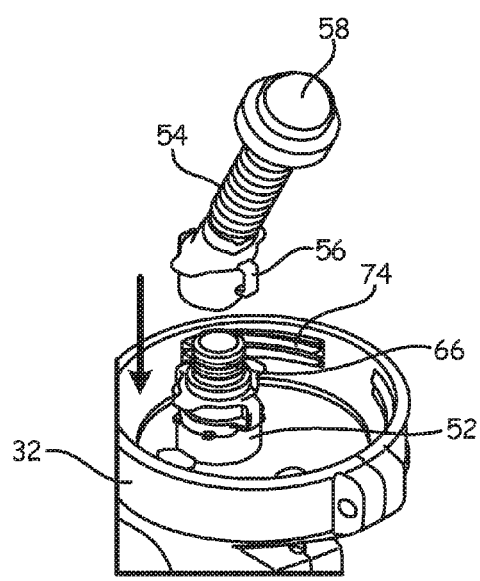
Fig. 4E
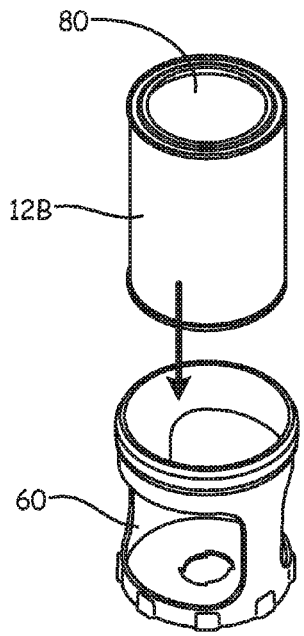
Fig. 4F
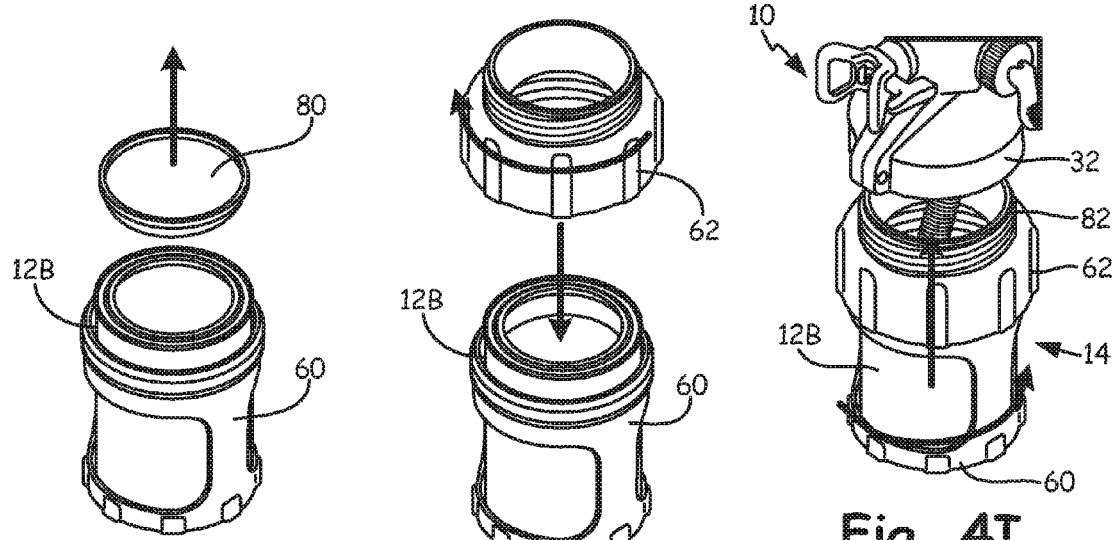
Fig. 4G
Fig. 4H
Fig. 4I

PAINT CAN ADAPTER FOR HANDHELD SPRAY DEVICE

CROSS-REFERENCE TO RELATED APPLICATION(S)

This application is a continuation-in-part of International Application No. PCT/US2014/037244 filed May 8, 2014. This application claims priority from U.S. Provisional Application Ser. No. 61/820,943, filed May 8, 2013, entitled INDUSTRY STANDARD PAINT CONTAINER ADAPTER TO HAND HELD SPRAY DEVICE, which is incorporated by reference.

BACKGROUND

Paint sprayers are well-known and popular for use in painting surfaces, such as architectural structures, furniture, and the like. For smaller jobs, which use a limited amount of paint, handheld spray devices are particularly advantageous. A handheld spray device includes a reservoir, typically in the form of a cup that is filled with paint and attached to the spray device. The overall weight of the spray device and the paint within the reservoir is small enough to allow the user to hold and orient the spray device in a variety of different directions in order to apply paint that is needed.

Paint is typically sold in paint containers (e.g., metal cans) in several industry standard sizes (volumes), which vary throughout the world. For example, in the United States, one common industry standard paint container size is one quart. In Europe, a common industry standard container size for paint is one liter.

Although industry standard paint container sizes exist, and the typical shape of the container is a cylindrical metal can with a friction fit lid, the dimensions of the paint container cans vary from manufacturer to manufacturer. For example, one liter paint cans may vary from about 4.2 to 4.4 inches in outer diameter and from about 5.0 inches to 5.7 inches in height. Similar variations exist for one quart metal paint cans.

Users of handheld paint sprayers have typically been required to pour paint from the paint can in which the paint was sold into the cup or reservoir that fits with the particular handheld spray device. When a paint job is completed, the reservoir is detached from the paint sprayer and any unused paint must be poured back into the paint can. Each time a job is completed, the reservoir must be emptied and cleaned, so that it will be ready for the next job.

SUMMARY

An adapter allows a paint can to act as a reservoir for a handheld spray device. The adapter connects and seals an open paint can to the handheld spray device so that paint from the paint can is supplied to an inlet of the handheld spray device. The gasket is positioned within the cap and engages the open upper end of the paint can to the cap.

In some embodiments, a can spacer insert is positionable in the cage to elevate the paint can so that the upper ring of the paint can engages the gasket.

BRIEF DESCRIPTION OF THE DRAWINGS

FIG. 3 is an exploded view of the adapter.

FIGS. 4A-4I illustrate steps performed in connecting a paint can to the handheld spray device using the adapter.

DETAILED DESCRIPTION

Figure 1A:
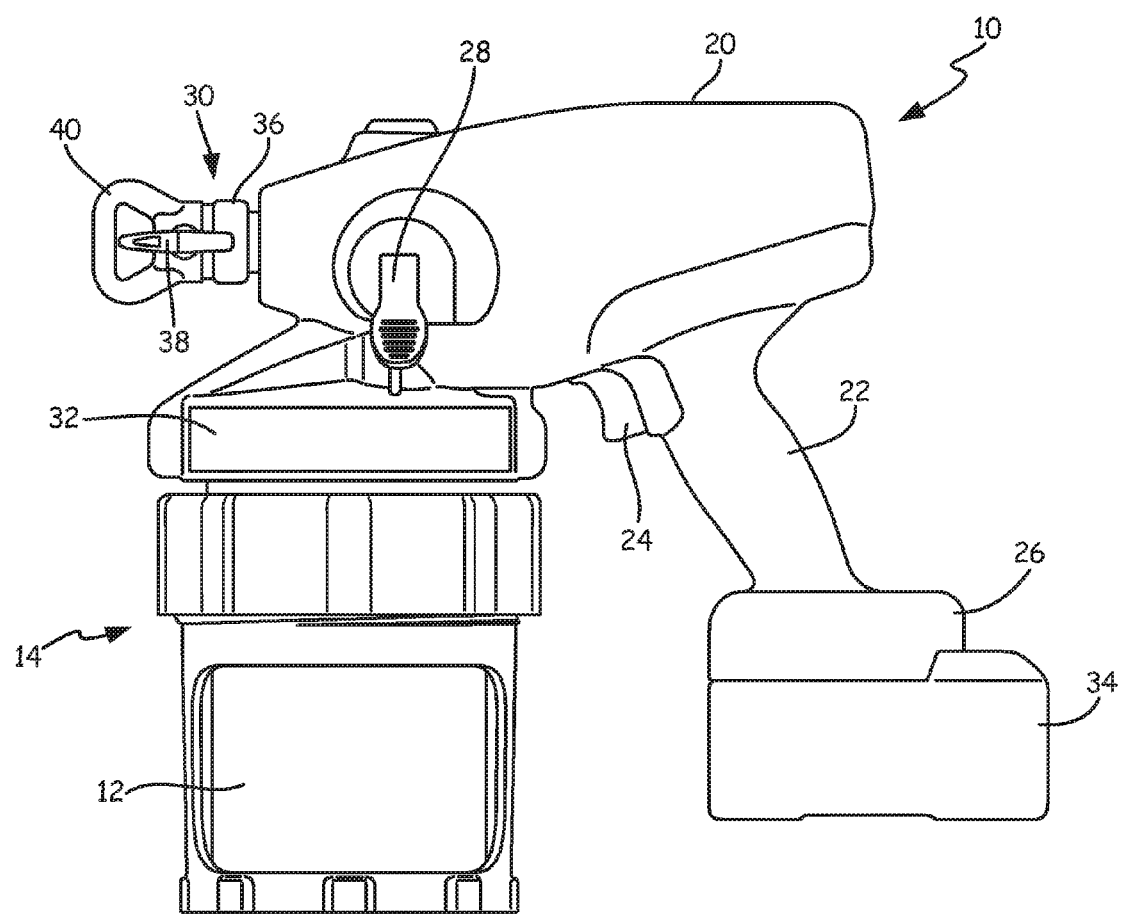
FIGS. 1A and 1B are a side elevational view and cross-sectional view, respectively, of a handheld spray device and an adapter for directly connecting a paint can to the paint spray device.
Figure 1B:
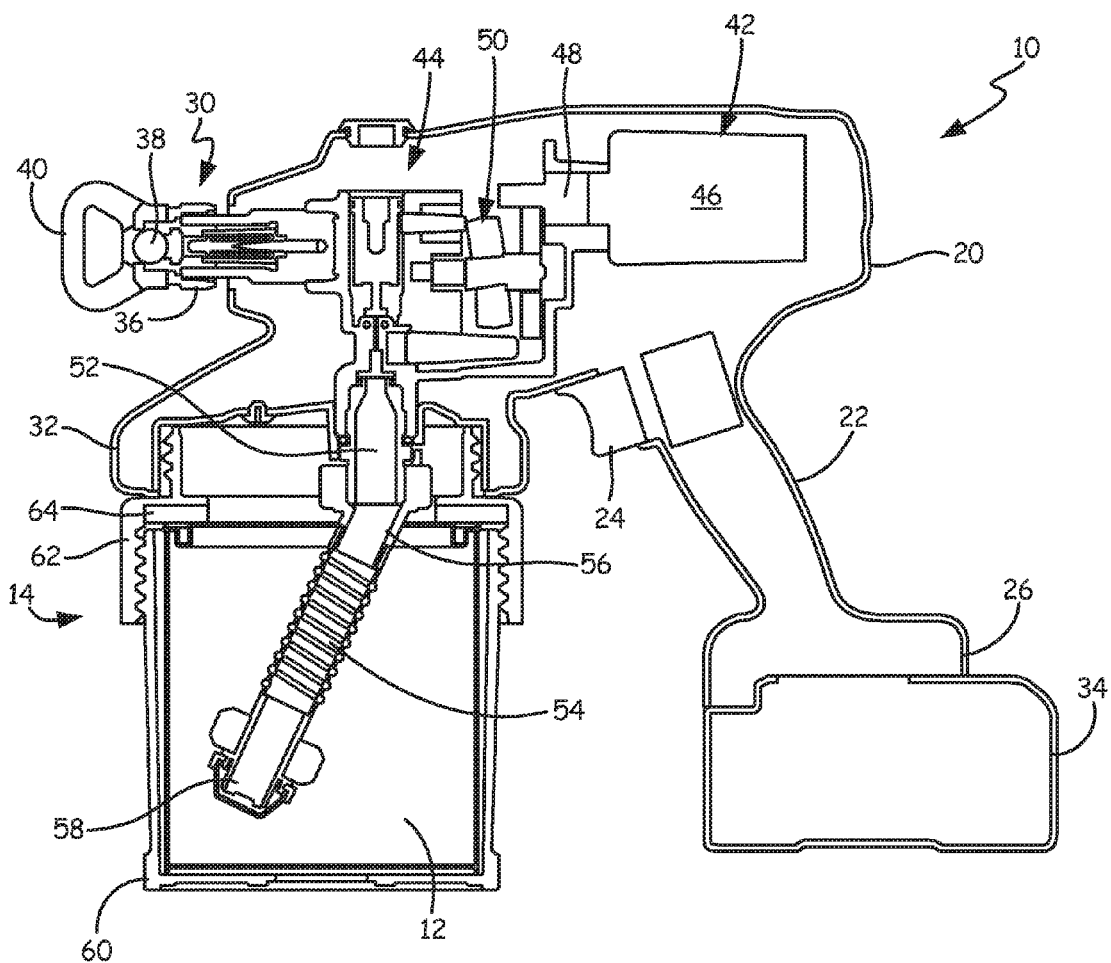

FIGS. 1A and 1B show a side view and a cross-sectional view, respectively, of handheld spray gun 10, paint can 12, and paint can adapter 14. In the embodiment shown in FIG. 1, handheld spray gun 10 is an airless spray gun of the type shown in U.S. Pat. No. 8,596,555, which is incorporated by reference.

The paint that is dispensed by sprayer gun 10 is supplied from paint can 12. Adapter 14 allows direct connection of industry standard paint containers of varying dimension (for example, one liter or one quart metal cans with a friction fit lid) to handheld spray devices (such as handheld airless spray gun 10 or other handheld spray devices such as high volume low pressure (HVLP) sprayers, air spray sprayers, and cup type spray guns) for spraying/dispensing without required use of a secondary container. The end user may thereby easily spray/dispense coatings from the original labeled paint container while using a handheld spray/dispensing device.

In the embodiments shown in FIGS. 1A and 1B, spray gun 10 includes housing 20, handle 22, trigger 24, battery port 26, pressure relief valve 28, spray tip assembly 30, and lid 32. Battery 34, which is attachable to battery port 26, provides electrical power used to operate spray gun 10. Spray tip assembly 30 includes connector 36, spray tip 38, and guard 40.

As shown in FIG. 1B, drive system 42 and pumping mechanism 44 are located within housing 20. Drive system 42 includes electric motor 46, gear train 48, and wobble plate 50 to the pistons of pump mechanism 44. Pump inlet 52 at the lower end of pump mechanism 44 extends through lid 32 and connects to suction tube 54 at outlet end 56. Suction tube 54 extends generally downward into adapter 14 and into the interior of paint can 12, so that inlet end 58 of suction tube 54 is positioned near the bottom end of can 12.

Adapter 14 includes cage 60, cap 62, and gasket 64. Cage 60 is sized to hold paint cans of a particular industry standard size, such as one liter or one quart. Depending on the particular paint manufacturer, can 12 may have the industry standard size (i.e., volume) while the diameter and height of can 12 can vary. Adapter 14 accommodates the potential variations in both diameter and height of can 12.

When can 12 is positioned within cage 60, as shown in FIG. 1B and the can lid (not shown) of can 12 is removed, cap 62 is threaded onto the upper end of cage 60 until gasket 64 seals the upper end of can 12 to cap 62. Adapter 14 along with can 12 can then be attached to spray gun 10 by threading cap 62 into lid 32, which is an integral part of housing 20.

Once adapter 14 is connected to spray gun 10, paint from can 12 can be sprayed by gun 10 by actuation of trigger 24. When trigger 24 is actuated, electrical power from battery 34 is supplied to electric motor 46, which drives wobble plate 50 through gear train 48. Motion of wobble plate 50 drives the pistons of pump mechanism 44. As a result, paint is drawn from the interior of can 12 through suction tube 54 and pump inlet 52 into pumping mechanism 44. Pressurized paint from pumping mechanism 44 is delivered to spray tip assembly 30, which produces a highly atomized flow of paint out of spray tip 38. Tip guard 40 prevents objects from contacting the high velocity output of fluid from spray tip 38.

Figure 2A:
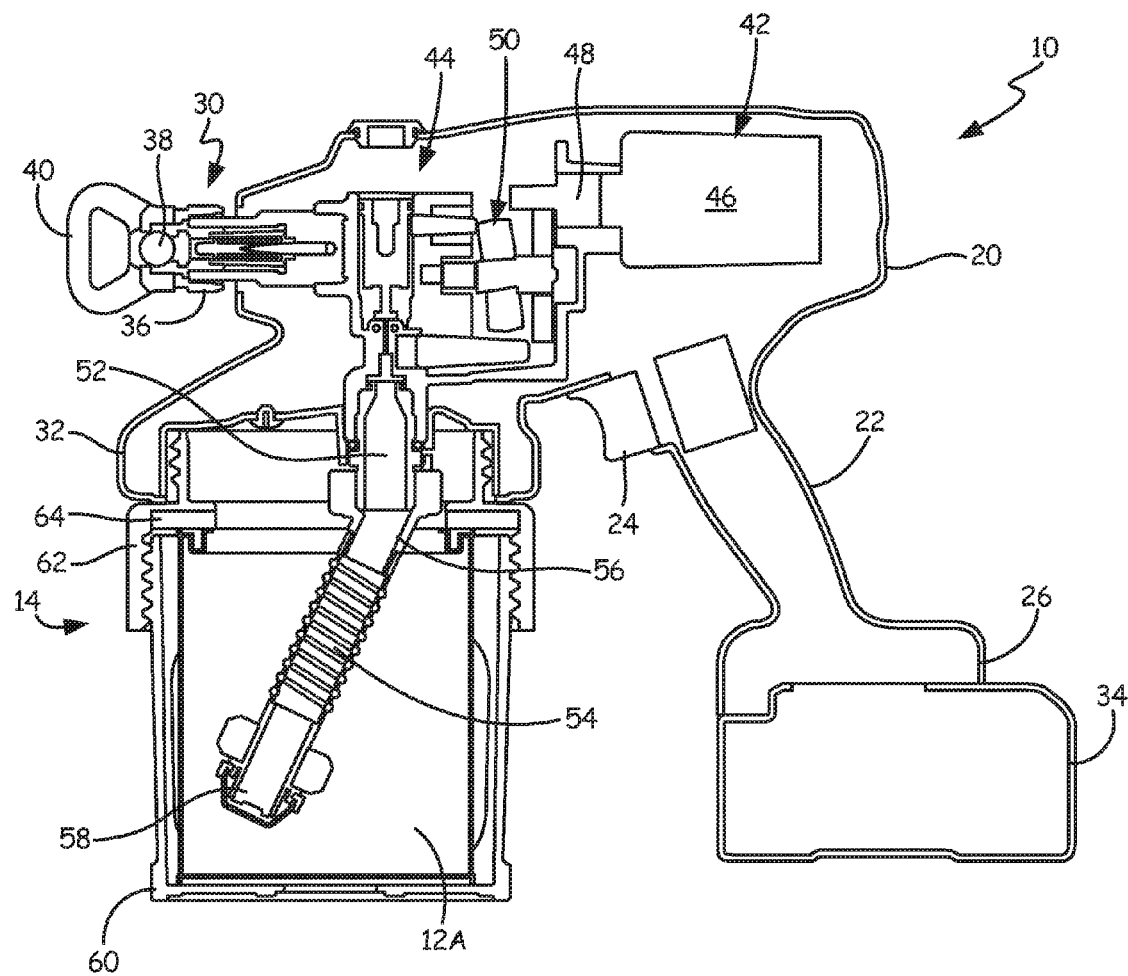
FIG. 2A-2C are sectional views of the handheld spray device and adapter of FIGS. 1A and 1B with paint cans of different dimensions.
Figure 2B:
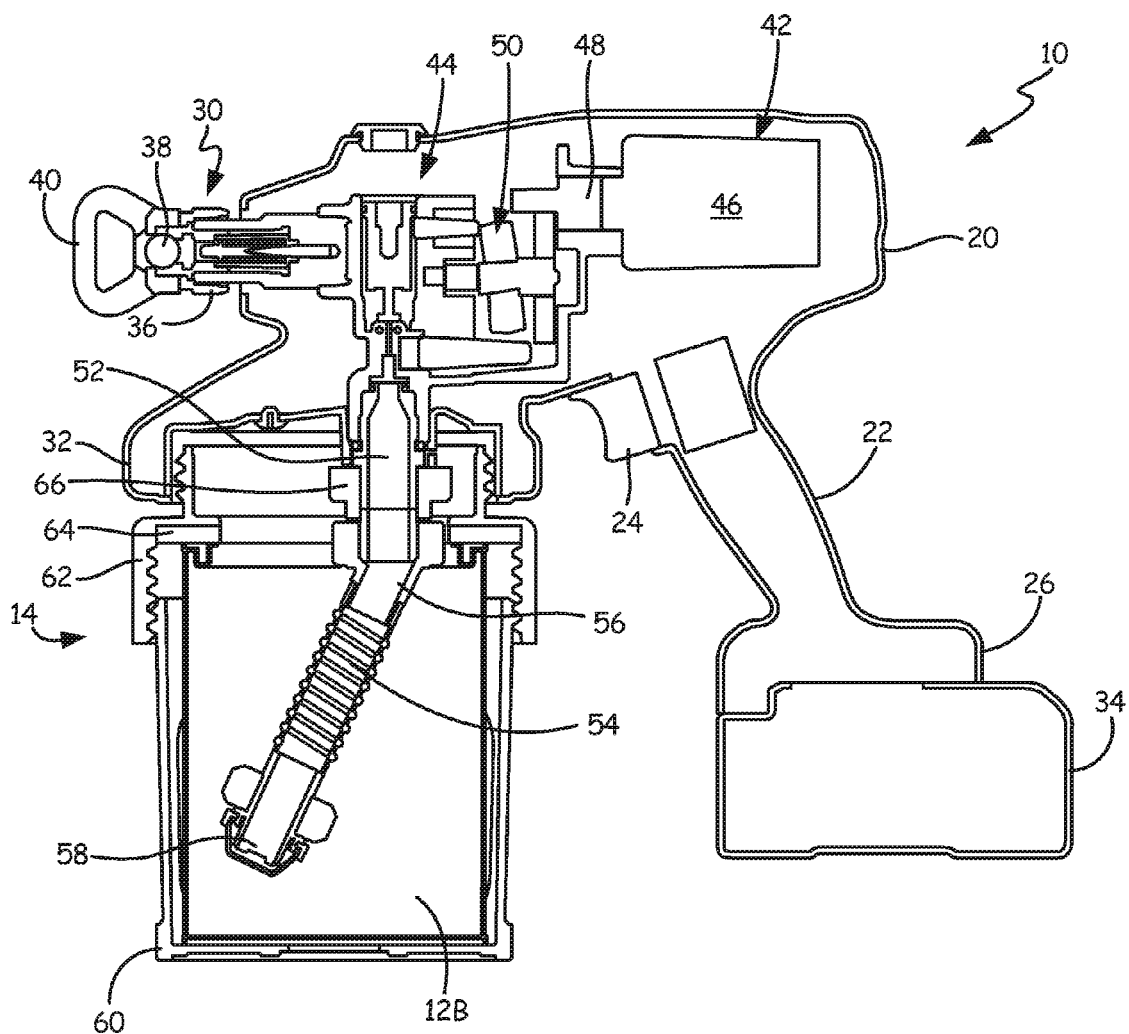
Figure 2C:
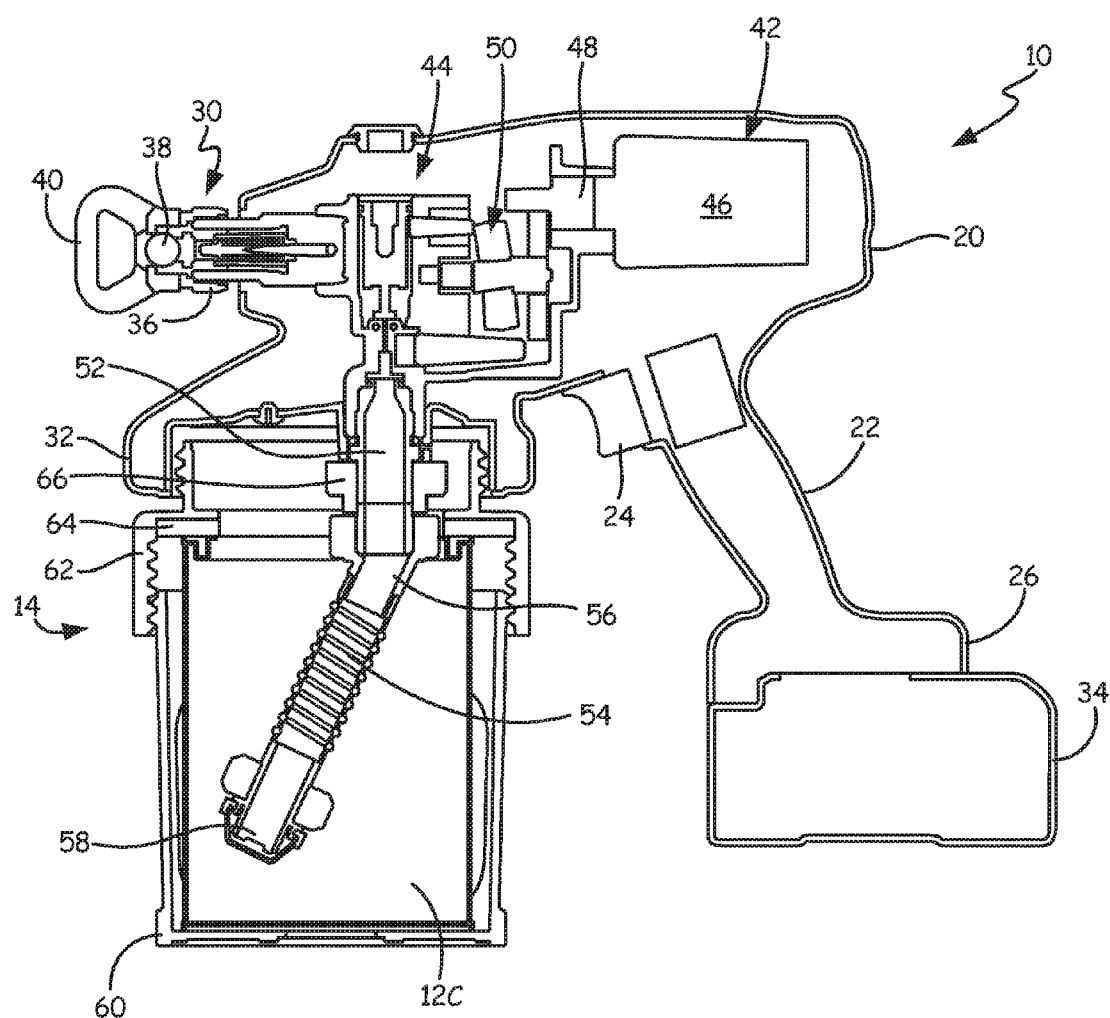

FIGS. 2A-2C are cross-sectional views of handheld spray gun 10 and adapter 14 used with cans 12A-12C that have different dimensions than can 12 shown in FIG. 1B. In FIGS. 2A-2C, elements similar to those shown in FIGS. 1A and 1B are labeled with similar reference numerals.

In FIG. 2A, can 12A has a height which is similar to the height of can 12 in FIG. 1B. The diameter of can 12A, however, is smaller than the diameter of can 12. As shown in FIGS. 1B and 2A, the height of cans 12 and 12A is such that cap 62 is threaded onto cage 60 to nearly the full extent allowed by the respective threads on cage 60 and cap 62. In both FIGS. 1B and 2A, the upper ends of cans 12 and 12A is sealed by gasket 64 to cap 62. Although the diameter of can 12A is smaller, the central apertures of cap 62 and gasket 64 have diameters that are small enough to still provide a seal of can 12A, while providing sufficient clearance to allow suction tube 54 to extend into can 12A.

FIGS. 2B and 2C show cans 12B and 12C, respectively. Cans 12B and 12C are taller than cans 12 and 12A shown in FIGS. 1B and 2A, respectively. As a result, cap 62 is not threaded as far downward on the upper end of cage 60 in FIGS. 2B and 2C, as compared to FIGS. 1B and 2A.

There is another difference shown in FIGS. 2B and 2C resulting from the greater height of cans 12B and 12C. Adapter 14 also includes, in FIGS. 2B and 2C, suction tube extension 66, which is inserted between pump inlet 52 and suction tube outlet 56. The upper end of extension 66 fits on the lower end of pump inlet 52. The lower end of extension 66 extends into the upper end of suction tube outlet 56. The addition of extension 66 shown in FIGS. 2B and 2C allows inlet end 58 of suction tube 54 to be positioned near the lower end of cans 12B and 12C.

The diameter of can 12C shown in FIG. 2C is smaller than the diameter of can 12B, shown in FIG. 2B. Despite the variation in can diameter, gasket 64 still provides a seal between the upper end of cans 12B and 12C and cap 62.

FIG. 3 is an exploded view of adapter 14, showing cage 60, cap 62, gasket 64, suction tube extension 66, and O-ring 68, which mounts on extension 66. As seen in FIG. 3, cage 60 includes mounting aperture 70 for receiving and holding extension 66 when adapter 14 is not in use. A twist lock connection is provided between cage 60 and extension 66 by aperture 70 and mating portions of extension 66.

FIGS. 4A-4I illustrate how adapter 14 is used to provide a direct connection between paint can 12B (shown in FIG. 2B) and handheld spray gun 10. In FIG. 4A, cup C is disconnected from lid 32 of handheld spray gun 10. Cup C is a typical cup used as a reservoir for holding paint, and is connected by external thread 72 to internal thread 74 of lid 32. In FIG. 2B, cup C has been removed. Suction tube 54 is being removed by twisting back and forth and pulling on suction tube 54 to remove it from pump inlet 52 (shown in FIGS. 1B, 2A-2C, and 4B.

In FIG. 4C, suction tube extension 66 is removed from cage 60 by twisting a quarter turn and removing upward from aperture 70. Suction tube extension 66 must be removed before cage 60 can receive and hold a paint can.

In FIG. 4D, lid 32 (and spray gun 10) are inverted so that pump inlet 52 is extending upward. Extension 66 is inserted onto pump inlet 52. Detent or notch 76 of extension 66 is aligned with orientation lug 78 of pump inlet 52 to ensure a consistent placement of extension 66 with respect to pump inlet 52. In some cases, as illustrated in FIGS. 1B and 2A, use of extension 66 is not required.

In FIG. 4E, lid 32 remains in an inverted position. Suction tube 54 is connected to extension 66 by inserting outlet end 56 onto extension 66.

In FIG. 4F, paint can 12B is inserted downward into cage 60. Can lid 80 covers the top end of can 12B in FIG. 4F.

In FIG. 4G, can 12B is in place within cage 60. Can lid 80 is removed so that the top end of can 12B is open.

In FIG. 4H, cap 62 is threaded onto the upper end of cage 60. Cap 62 will be rotated in a clockwise direction shown in FIG. 4H until gasket 64 (not shown) seals with the upper end of can 12B.

In FIG. 4I, adapter 14 is attached to lid 32 of handheld spray gun 10. External threads 82 at the upper end of cap 62 engage internal threads 74 of lid 32. Adapter 14 is rotated in a counterclockwise direction to engage threads 82 with threads 74. Once adapter 14 is connected to lid 32, handheld spray gun 10 is ready for use.

After spraying has been completed, the process shown in FIGS. 4A-4I is reversed. Adapter 14 is detached from handheld spray gun 10 by rotating adapter 14 in a clockwise direction. Once adapter 14 is disconnected from spray gun 10, cap 62 can be removed from cage 60, can lid 80 can be placed on the top end of can 12B, and can 12B can be removed from cage 60.

Clean up can be performed using cup C filled with water or other appropriate solvent. Suction tube 54 can be inserted into the water in cup C and spray gun 10 can be operated to flush water through suction tube 54, extension 66, pump inlet 52, pumping mechanism 44, and spray tip mechanism 30 to clean the components that were in contact with the paint. Suction tube 54 can then be disconnected from extension 66, so that extension 66 can be removed and re-stowed within cage 60 of adapter 14. Suction tube 54 can then be reattached to pump inlet 52, and cup C (after any remaining water has been removed) can be reattached to lid 32.

Figure 5A:
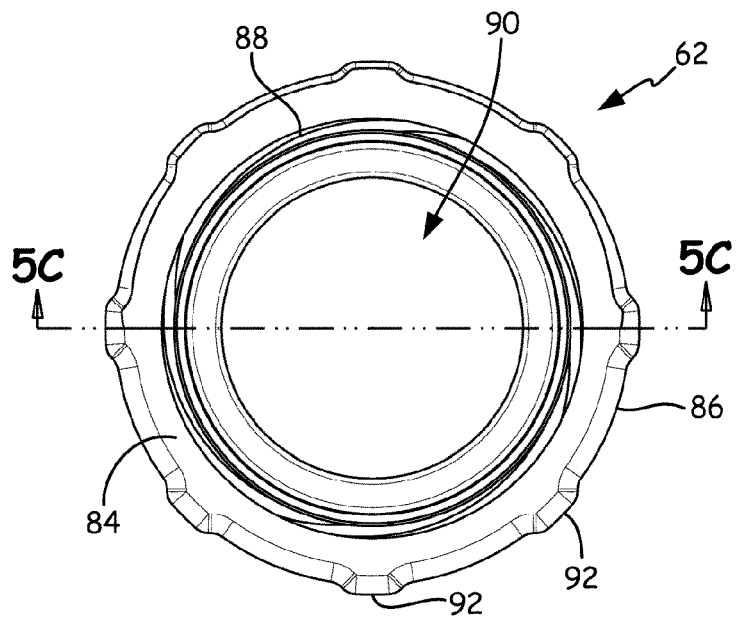
FIGS. 5A-5C are views of the cap of the adapter.
Figure 5B:
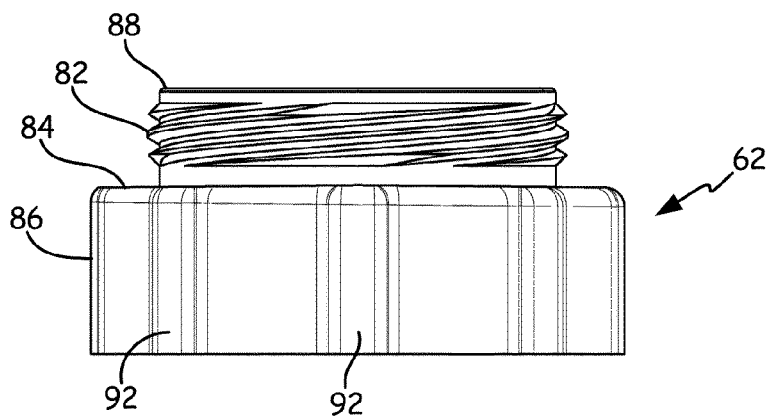
Figure 5C:
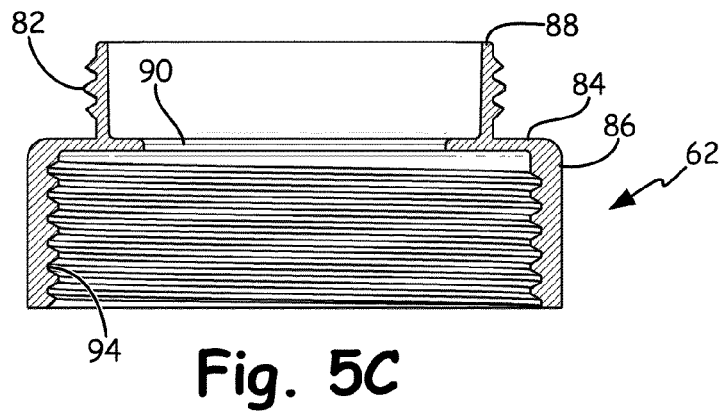

FIGS. 5A-5C show cover 62 of adapter 14 in further detail. FIG. 5A is a top view, FIG. 5B is a front view, and FIG. 5C is a sectional view along section 5C-5C of FIG. 5A.

Cover 62 includes top 84, cylindrical sidewall or skirt 86 and neck 88. Top 84 includes center aperture 90, through which suction tube 54 is inserted. Sidewall 86 has vertical ribs 92 on its outer surface and internal threads 94 on its inner surface. External threads 82 are located on the outer surface of neck 88.

Figure 6A:
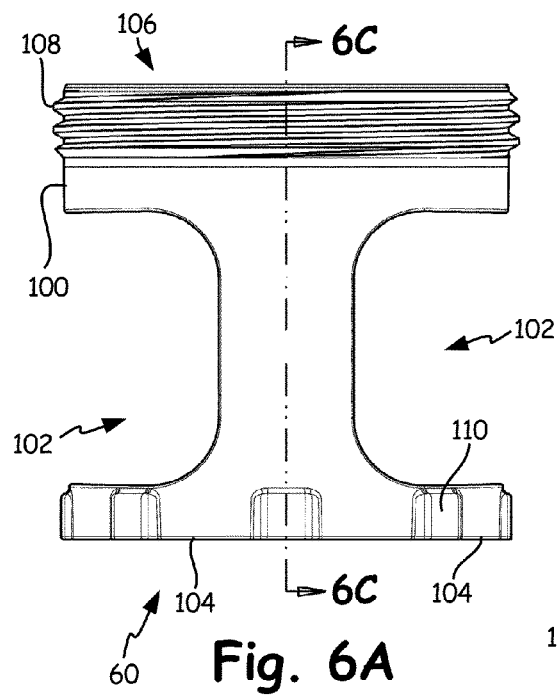
FIGS. 6A-6D are views of the cage of the adapter.
Figure 6B:
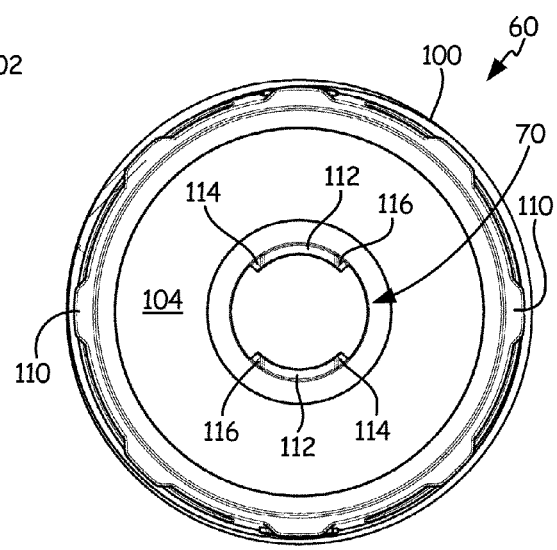
Figure 6C:
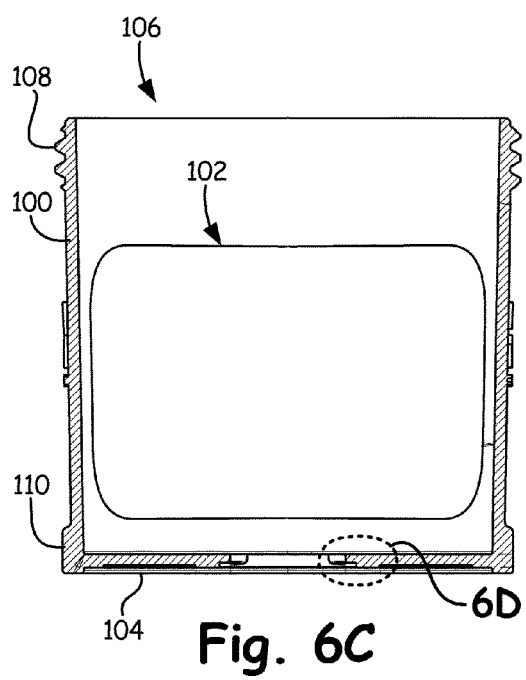
Figure 6D:
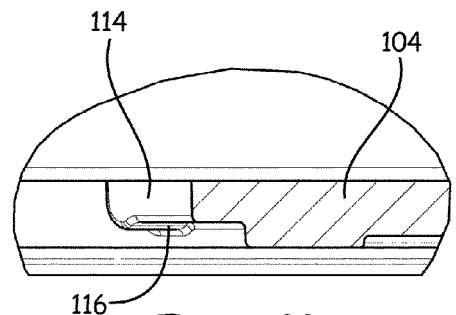

FIGS. 6A-6D show views of cage 60. FIG. 6A is a front view, 6B is a bottom view, FIG. 6C is a sectional view along section 6C-6C of FIG. 6A, and FIG. 6D is a detail view of detail 6D in FIG. 6C.

Cage 60 includes cylindrical sidewall 100 with windows or apertures 102, closed bottom 104, and opened top 106. External threads 108 are located at the upper end of sidewall 100. Ribs 110 are located at the bottom end of sidewall 100.

Mounting hole 70 for extension 66 is located in bottom 104. Arcuate flanges 112 with ramps 114 and stops 116 provide a locking mechanism to hold extension 66 in place.

A quarter turn (90 degrees) of extension 66 in one direction will lock extension 66 in place. Rotation by a quarter turn (90 degrees) in the opposite direction will release extension 66 from being held in place by arcuate flanges 112 so that extension 66 can be removed from cage 60 when adapter 14 is to be used.

As shown in FIGS. 2A-2C and in FIGS. 5C and 6A, external threads 108 on cage 60 are shorter than internal threads 94 of cap 62. This allows cap 62 to be threaded onto cage 60 to different extents, depending upon the height of the paint can that has been placed in cage 60.

In one embodiment, cage 60 and cap 62 are made of high impact strength polypropylene. This provides impact strength for adapter 14 and also provides resistance to solvents that may be present in some of the materials that can be sprayed.

Figure 7A:
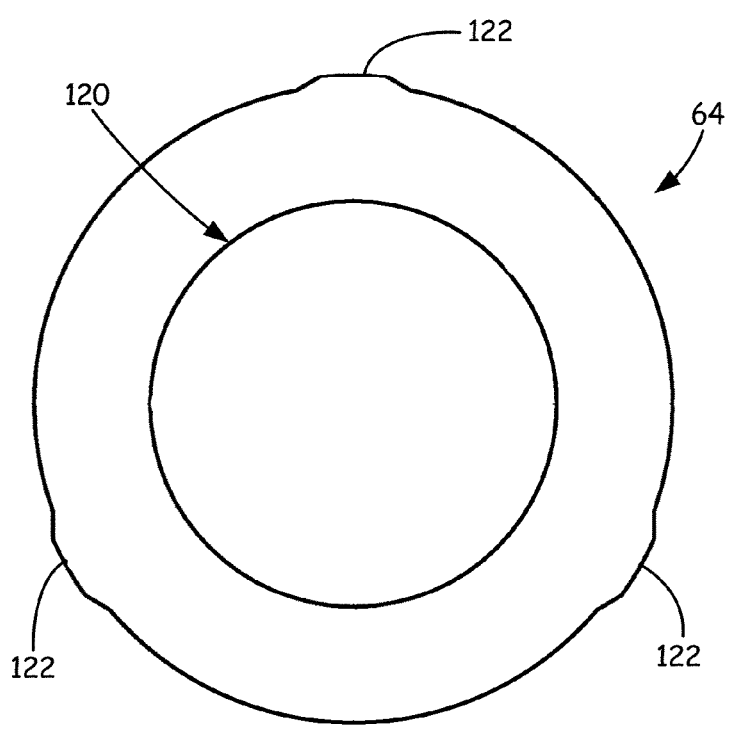
FIGS. 7A-7B are views of the gasket of the adapter.
Figure 7B:
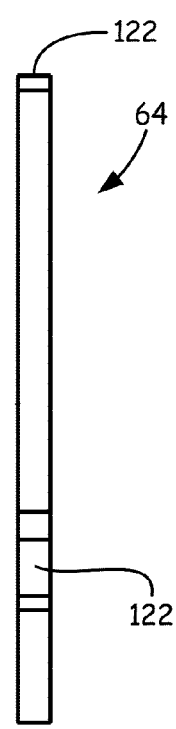

FIG. 7A and 7B show gasket 64. FIG. 7A is a top view, and FIG. 7B is a side view of gasket 64. Gasket 64 is a flat ring of resilient foam material such as crosslinked polyethylene foam. The foam material is a closed cell foam, so that paint that contacts gasket 64 will not be absorbed into gasket 64.

Gasket 64 includes central aperture 120, which is typically of the same diameter as aperture 90 in cap 62. Along the outer edge of gasket 64 are tabs 122, which will engage internal threads 94 of cap 62 to hold gasket 64 in place against the inner surface of top 84 of cap 62. In one embodiment, gasket 64 has a thickness of about 0.25 inches.

Figure 8A:
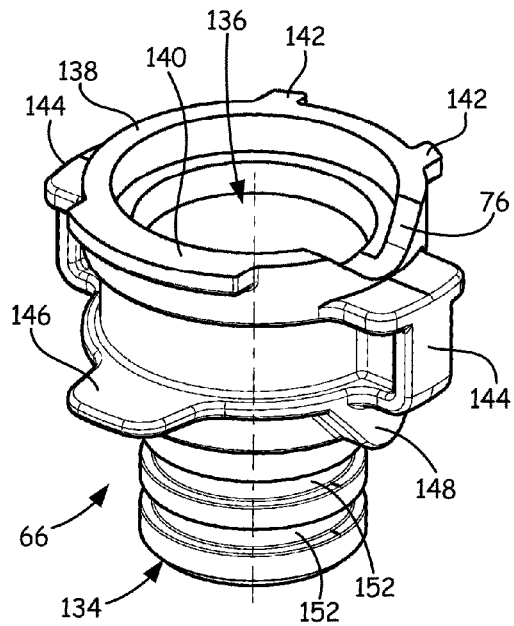
FIGS. 8A-8D are views of a suction tube extension for use with the adapter.
Figure 8B:
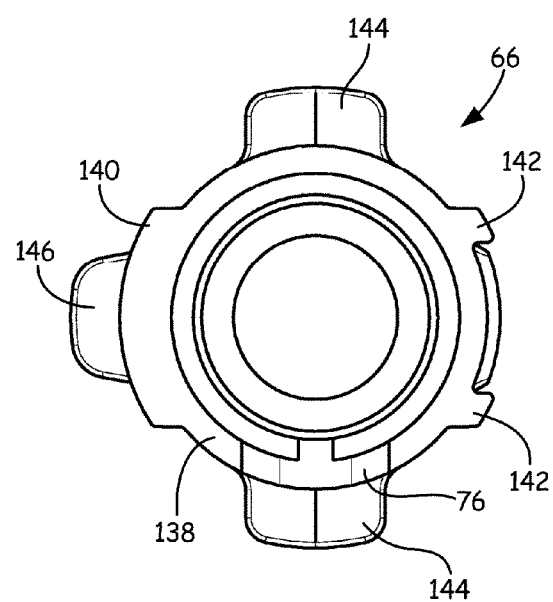
Figure 8C:
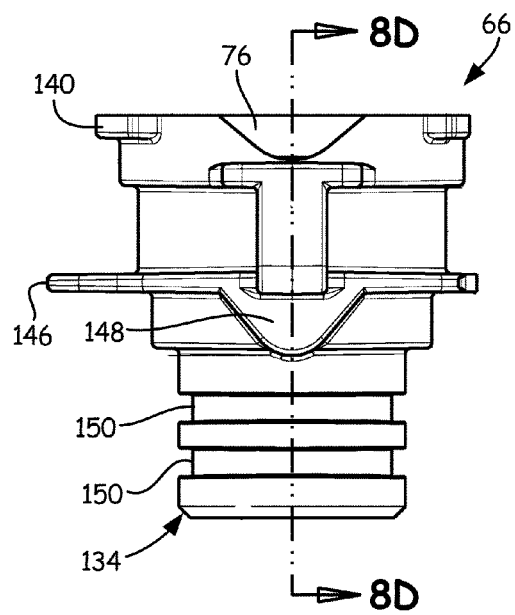
Figure 8D:
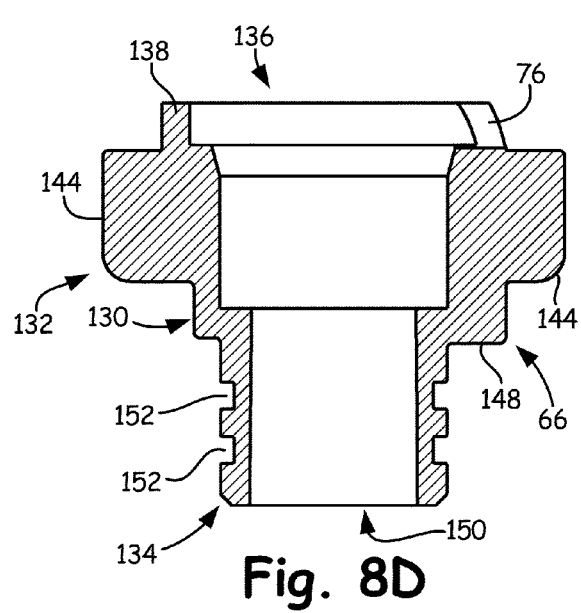
Figure 9A:
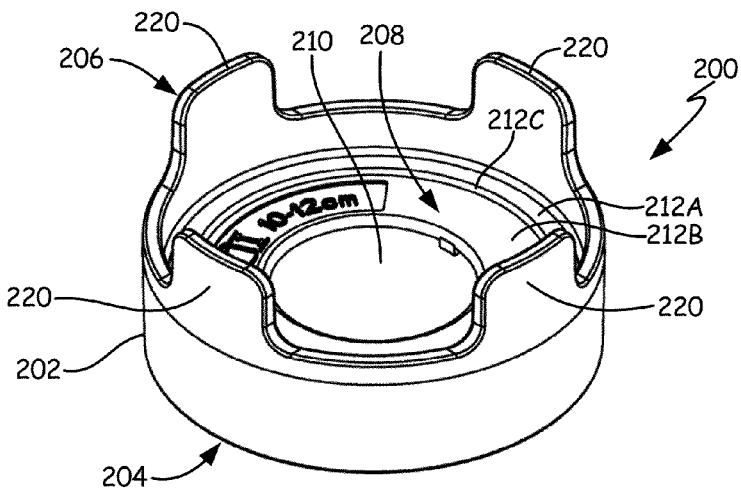
FIG. 9A is a perspective view of a spacer insert for use with the adapter.
Figure 9B:
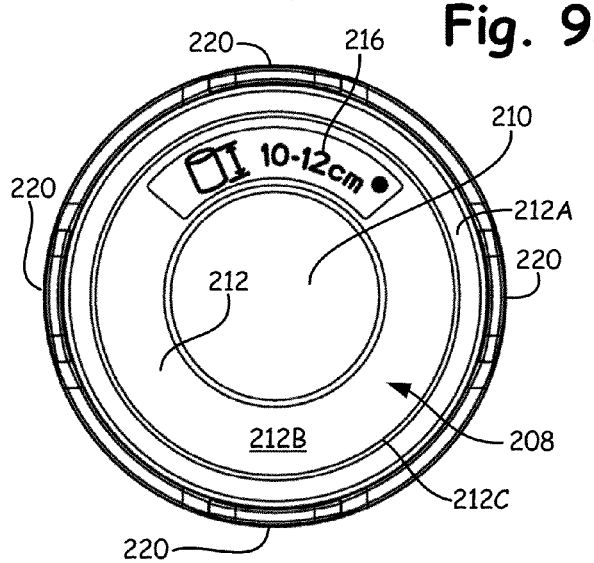
FIG. 9B is a top view of the spacer insert.
Figure 9D:
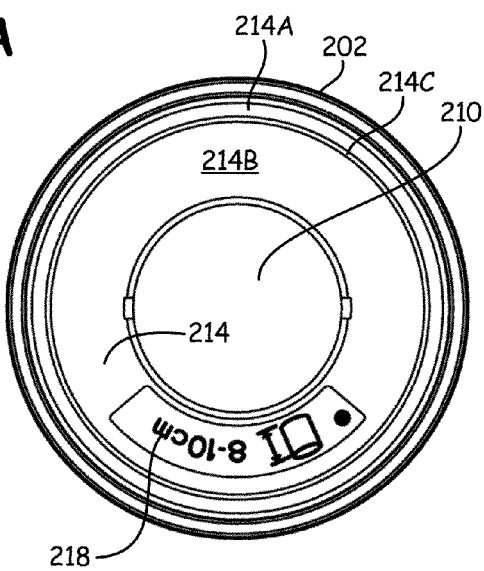
FIG. 9D is a bottom view of the spacer insert.
Figure 9C:
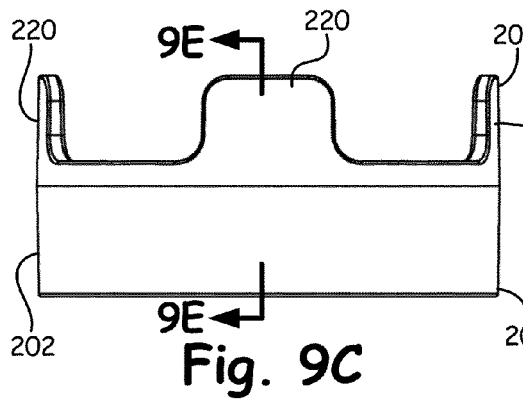
FIG. 9C is a side view of the spacer insert.
Figure 9E:
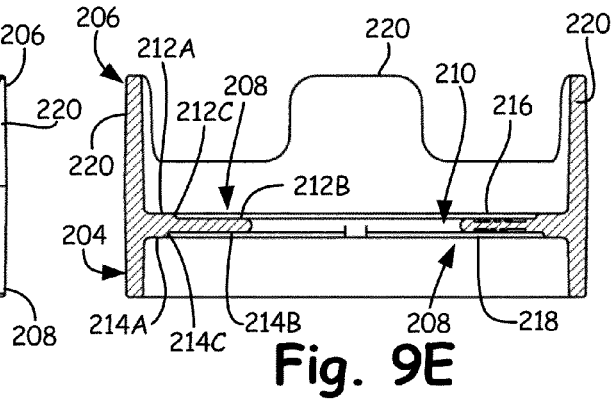
FIG. 9E is a sectional view along section 9E-9E of FIG. 9C.

FIGS. 8A-8D show suction tube extension 66, which is used in order to ensure that inlet end 58 of suction tube 54 will be positioned near the bottom of the paint can. FIG. 8A is a perspective view, FIG. 8B is a top view, FIG. 8C is a front view, and FIG. 8D is a sectional view along section 8D-8D of FIG. 8C. As shown in FIGS. 8A-8C, extension 66 is oriented as it will be when it is to be attached to pump inlet 52 of spray gun 10. When extension 66 is to be stored in cage 60, it is in an inverted orientation.

As shown in FIGS. 8A-8D, extension 66 is formed by unitary plastic molded body 130 at upper section 132 and lower section 134. Upper section 132 includes upper bore 136, upper rim 138, flange 140, fingers 142, wings 144, handle 146, and V-shaped orientation lug 148. V-shaped detent 76 is located in rim 138. Lower section 134 with lower bore 150 that connects to upper bore 136 and annular grooves 152 which hold O-rings 68 shown in FIG. 3.

When extension 66 is in use, upper bore 136 receives the lower end of pump inlet 52. Detent 76 receives orientation lug 78 of pump inlet 52, as shown in FIG. 4D. Lower section 134 is inserted into outlet end 56 of suction tube 54. Orientation lug 148 mates with a corresponding detent in outlet end 56 of suction tube 54. Detent 76 and lug 148 of extension 66 are aligned, so that the desired orientation of suction tube 54 with respect to pump inlet 52 is maintained when extension 66 is placed between pump inlet 52 and suction tube 54.

When extension 66 is to be stored in cage 60, flange 140 and fingers 142 are placed into mounting hole 70 in cage 60. Flange 140 fits into one gap between flanges 112, and fingers 142 fit into the opposite gap between flanges 112 in cage 60. A quarter turn of extension 66 with respect to cage 60 causes flange 140 to ride up over one ramp 114 and into engagement with one flange 112, while fingers 142 ride over the other ramp 114 and onto the other flange 112. Stops 116 prevent further rotation of extension 66. When extension 66 is to be removed, it is rotated in the opposite direction by 90 degrees, and then can be lifted out of mounting aperture 70 and removed from cage 60.

Adapter 14 allows direct connection of industry standard paint containers such as paint cans to handheld spray devices. Although adapter 14 has been described in conjunction with an airless handheld spray device, other handheld spray devices can also be used in conjunction with adapter 14. This allows the end user to easily spray and dispense coatings from the original labeled containers, rather than requiring the use of a secondary container and the associated pouring of paint from one container to another.

In order to accommodate paint cans of varying dimensions, several parameters should be considered. First, the inner diameter of cage 60 should be at least as large as the largest outer diameter of the variety of containers with which it will be used. Second, the inner container receiving height of cage 60 should be no higher than the shortest of the variety of containers with which it will be used without a spacer insert. This is required so that cap 62 and gasket 64 will be allowed to engage and seal to the top end of the paint can. Third, the threads connecting cage 60 and cap 62 must extend axially a sufficient distance to allow engagement while accommodating containers of varying height.

The dimensions of paint container cans vary from manufacturer-to-manufacturer, and may also vary from country-to-country. The threaded connection between cage 60 and cap 62 allow adapter 14 to accommodate containers of varying heights. FIGS. 9A-9E show spacer insert 200, which can be used to extend the range of can heights that can be accommodated by adapter 14. Spacer insert 200 can be positioned at the bottom of cage 60 to raise cans of short height so that the opened upper end of a paint can will engage gasket 64. In the embodiment shown in FIGS. 9A-9E, spacer insert 200 can be mounted in two different orientations within cage 60 to act as a platform or shim for two different height ranges of paint cans.

Spacer insert 200 includes cylindrical sidewall 202 having bottom end 204 and top end 206, and shelf 208, which extends radially inward from sidewall 202 to central aperture 210. Shelf 208 defines first can support surface 212 (with outer ring 212A adjacent sidewall 202 and inner ring 212B adjacent outer ring 212A) and second can support surface 214 (with outer ring 214A adjacent sidewall 202 and inner ring 214B adjacent outer ring 214A).

Shelf 208 is located closer to lower end 204 than upper end 206 of sidewall 202. As a result, spacer insert 200 can provide two different platform height ranges for supporting a paint can, depending upon whether insert 200 is in the position shown in FIGS. 9A-9E, or is inverted.

First support surface 212 of shelf 208 includes label 216, which includes an indication of the range of can heights that are to be supported on first support surface 212. In this particular embodiment, the range of can heights is 10 to 12 cm.

Similarly, second support surface 214 includes label 218, which includes an indication of another range of can heights that are to be supported by can support surface 214. In this example, the can heights associated with support surface 214 are in a range of 8 to 10 cm. Labels 216 and 218 may be adhesively attached to surfaces 212 and 214, the label may be printed onto surfaces 212 and 214, or may be formed as part of a molding process that creates insert 200.

Inner rings 212B and 214B are recessed with respect to outer rings 212A and 214A, respectively. As a result, shoulder 212C is formed between rings 212A and 212B, and shoulder 214C is formed between rings 214A and 214B. Outer rings 212A and 214A support larger outer diameter paint cans, while inner rings 212B and 214B support smaller outer diameter paint cans. Shoulders 212C and 214C keep smaller outer diameter paint cans centered within cage 60, so that the upper ends of the smaller diameter paint cans will seal properly with gasket 64.

In the embodiment shown in FIGS. 9A-9E, upper end 206 of insert 200 is castellated. Four tabs (or castellations) 220 extend upward when insert 200 is oriented as shown in FIGS. 9A-9E.

Aperture 210 in floor 208 is sized so that insert 200 can be positioned at the bottom of cage 60 for storage, with extension 66 also mounted at the bottom of cage 60 for storage purposes. Extension 66 extends upward through aperture 210 when adapter 14 is not in use.

Figure 10A:
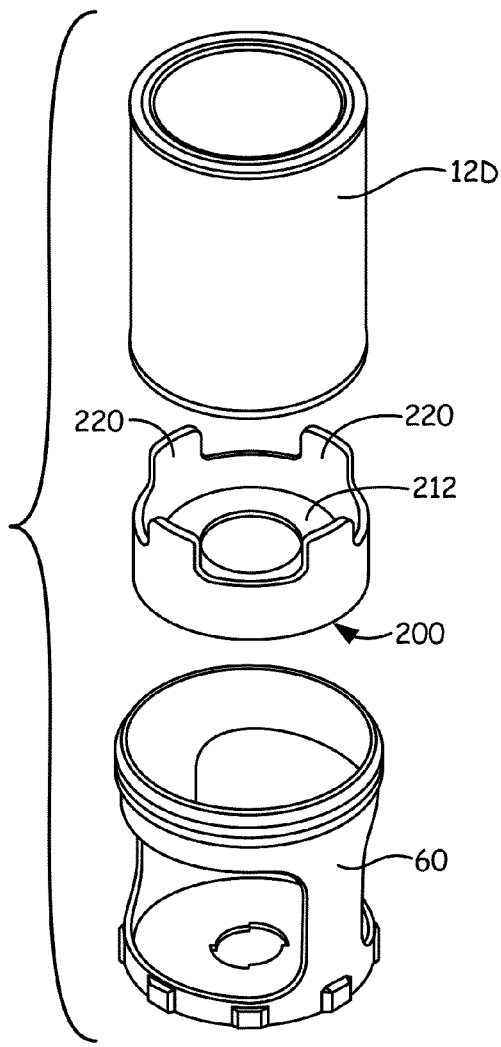
FIG. 10A is an exploded view showing a paint can, the spacer insert, and the cage, with the spacer insert oriented for use with paint cans of a first height range.
Figure 10B:
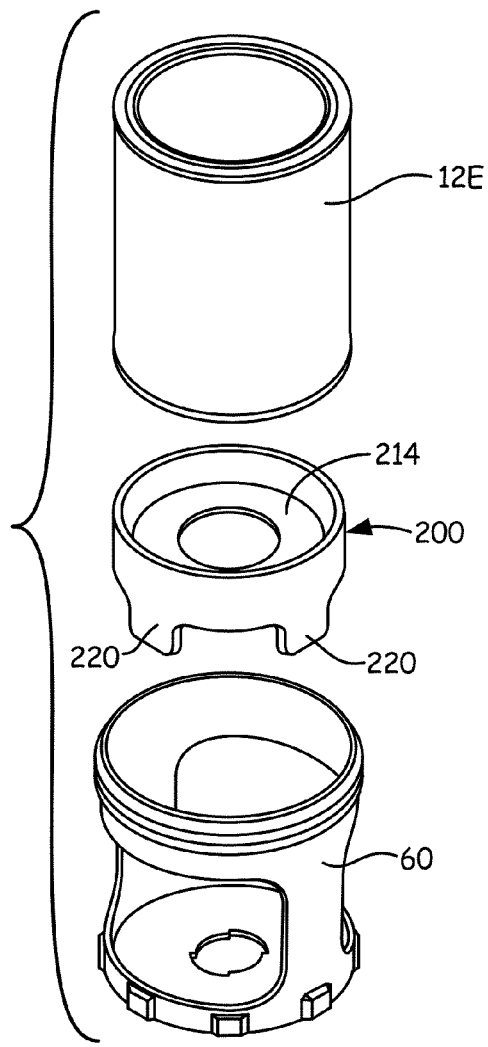
FIG. 10B is an exploded view showing a paint can, the spacer insert, and the cage, with the spacer insert oriented for use with paint cans of a second height range.

FIGS. 10A and 10B show two different orientations of adapter 200, for use with two different can height ranges. In FIG. 10A, insert 200 is oriented so that tabs 220 extend upward. In this orientation, paint can 12D will be positioned within cage 60 with the bottom of can 12D resting on support surface 212 of floor 208.

In FIG. 10B, insert 200 has been inverted from the orientation shown in FIG. 10A. Tabs 220 face downward, and support surface 214 faces upward. The bottom of paint can 12E will rest on support surface 214 of insert 200, with can 12E and insert 200 both positioned within cage 60. In FIG. 10A, the platform height provided by insert 200 to elevate can 12D is based upon the distance between the bottom edge of bottom section 204 of adapter 200 and support surface 212. In FIG. 10B, the platform height provided to support can 12E based upon the distance between the end surfaces of tabs 220 and support surface 214.

The use of adapter 14 provides a number of advantages. Easy, reliable, and sealed connection of standard industry paint cans and containers of varying dimensions to spray devices is achieved. Easy change and storage of multiple paint colors can be achieved. The use of the paint can as the reservoir eliminates the need for cleaning a secondary container after every paint job. The open sided cage allows spraying/dispensing of paints in their originally labeled containers and allows the exterior of the container to be viewed by the user for convenient identification of the type/color of material currently connected to the sprayer. With the use of adapter 14, including insert 200, the vast majority of paint cans on the market in North America and Europe are compatible with a handheld spray gun.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, although the attachment of adapter 14 to spray gun 10 and the attachment of cap 62 to cage 60 are shown as threaded connections, other forms of connection systems can be used to reliably attach and seal a standard paint container (paint can) to a handheld paint spray device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An adapter for holding and sealing a paint can of an industry standard size and one of a plurality of different heights below a handheld paint sprayer, the handheld paint sprayer having a bottom side interface that includes a pump inlet and a female threaded lid surrounding the pump inlet, the adapter comprising:
 a cage dimensioned to receive the paint can, the cage having first male threading;
 a ring having second female threading, the ring configured to connect to one end of the cage via interface between the first male threading of the cage and the second female threading of the ring so that the paint can is contained within a paint can holding structure formed by the cage and the ring;
 a gasket configured and positioned within the paint can holding structure formed by the cage and the ring to interface and form a seal with a top end of the paint can when the paint can is contained within the paint can holding structure;
 a tubular neck extending upward from and surrounding an aperture in a top exterior surface of the paint can holding structure, the neck having third male threading configured to screw into the female threaded lid of the bottom side interface of the handheld paint sprayer so that the the paint can holding structure is mountable below the handheld paint sprayer;
 a suction tube having an outlet end for connection to the pump inlet and an inlet end for positioning within the paint can; and
 wherein the cage, the gasket, the ring, and the neck are coaxially aligned when the paint can is contained within the paint can holding structure; and
 wherein the cage includes at least one side window.

2. The adapter of claim 1, wherein the gasket is a foam ring having an aperture.

3. The adapter of claim 2, wherein the aperture in the foam ring and the aperture in the tip exterior surface are aligned and dimensioned to allow the suction tube to extend through the aperture and into the paint can.

4. The adapter of claim 2, wherein the foam ring is formed of a closed cell crosslinked polyethylene foam.

5. The adapter of claim 1, wherein:
 the ring is a cap that mounts on a top of the cage,
 the second female threading is located on an interior surface of the cap, and
 the third male threading, the neck, and the top exterior surface are located on the cap.

6. The adapter of claim 1, wherein the cage includes multiple side windows which expose the standard paint can when the paint can is within the cage.

7. The adapter of claim 1, wherein the cage and the ring are each formed from polymeric material.

8. The adapter of claim 1, wherein the paint can is a one liter or one quart sized metal can with a friction fit lid.

9. An adapter for holding and sealing a metal paint can of a plurality of different heights below a handheld paint sprayer, the handheld paint sprayer having a bottom side interface the adapter comprising:
- a cage dimensioned to receive the metal paint can, the cage having first male threading, the cage having multiple side windows which expose the metal paint can when the metal paint can is within the cage;
- a ring having second female threading, the ring configured to connect to the cage via interface between the first male threading of the cage and the second female threading of the ring to form a paint can holding structure;
- a gasket positioned within the paint can holding structure and configured to create a seal with the metal paint can, the gasket comprising a foam ring having an aperture;
- a tubular neck extending upward from and surrounding an aperture in a top exterior surface of the paint can holding structure, the neck having the third male threading configured to threadedly screw into the bottom side interface of the handheld paint sprayer so that the metal paint can is held in the cage below the handheld paint sprayer when the paint can holding structure containing the metal paint can is mounted to the handheld paint sprayer;

wherein the cage, the gasket, the ring, and the neck are coaxially aligned when the paint can holding structure containing the metal paint can is mounted to the handheld sprayer, and wherein the cage includes at least one side window.

10. The adapter of claim 9, wherein the aperture of the foam ring and the aperture of the top exterior surface are aligned and dimensioned to allow a suction tube to extend through the aperture and into the metal paint can.

11. The adapter of claim 9, wherein:
the ring is a cap that mounts on a top of the cage,
the second female threading is located on an interior surface of the cap, and
the third male threading and the top exterior surface are located on the cap.

12. The adapter of claim 9, wherein the cage and the ring are each formed from polymeric material.

13. The adapter of claim 9, wherein the metal paint can is a one liter or one quart sized container.

* * * * *